Sept. 27, 1927.  
D. H. McCLELLAND  
DEMOUNTABLE TIRE RIM  
Filed Sept. 5, 1924  
1,643,672  
2 Sheets-Sheet 2
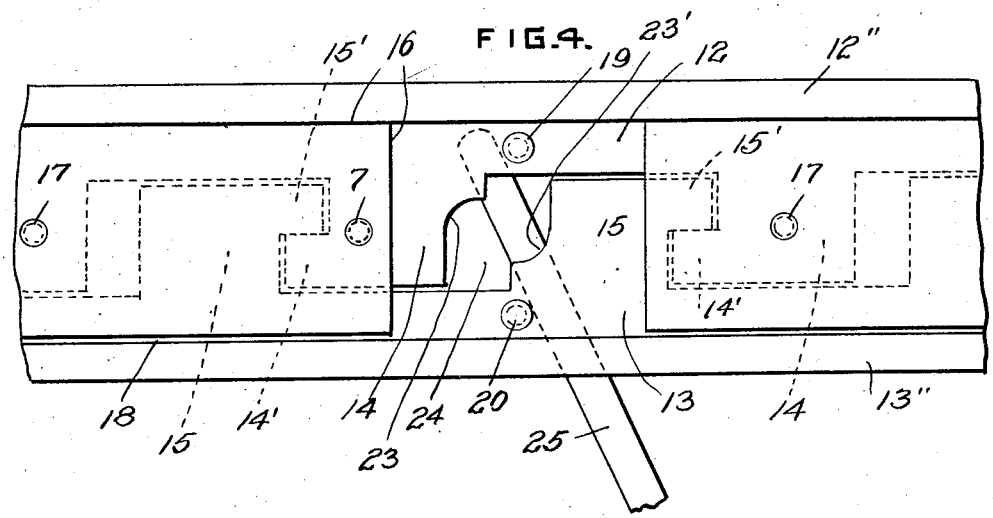
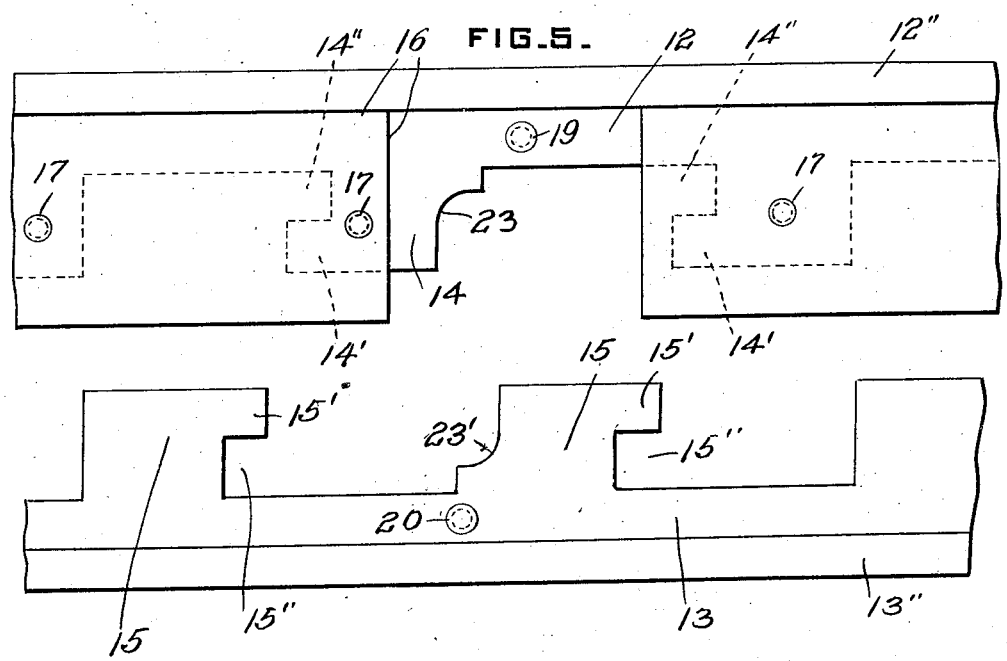
WITNESSES  
INVENTOR Patented Sept. 27, 1927.

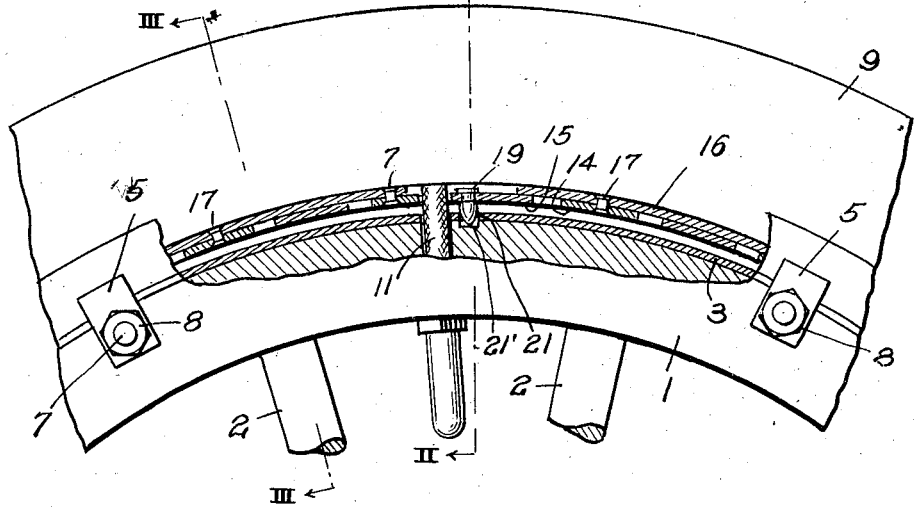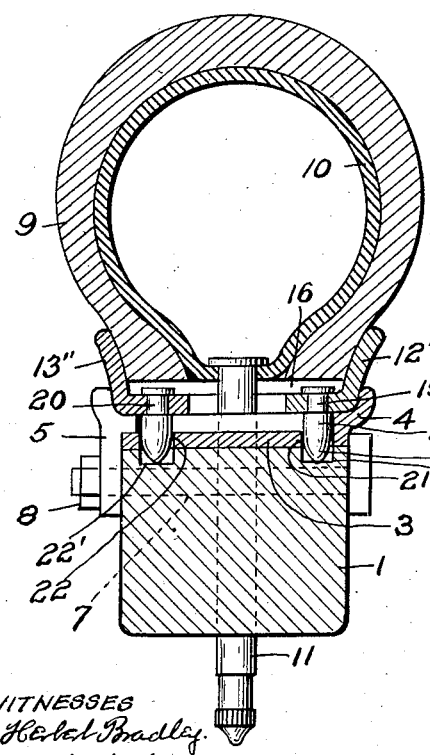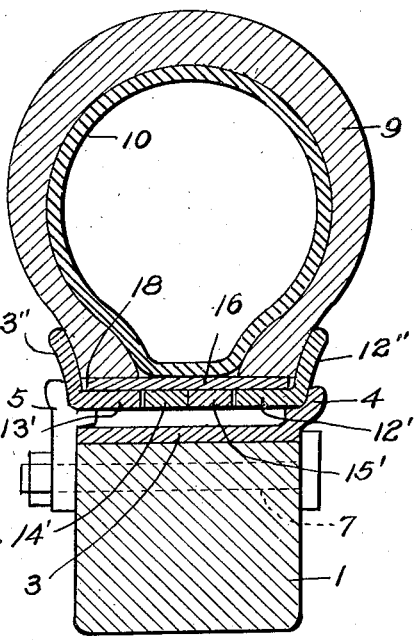

1,643,672

UNITED STATES PATENT OFFICE.

DAVID H. McCLELLAND, OF PITTSBURGH, PENNSYLVANIA.

DEMOUNTABLE-TIRE RIM.

Application filed September 5, 1924. Serial No. 736,032.

This invention relates to rims, and particularly to demountable tire rims for use in connection with pneumatic tires on motor vehicles.

It is an object of the invention to provide a demountable rim, simple in construction, sturdy and durable, easy to manipulate, economical to manufacture, which will not easily get out of order, and which is adapted for use on automobiles generally.

Special objects are to provide a demountable rim comprising two cooperating annular sections identical in construction and interchangeable, in which the sections can be easily and quickly locked together or separated, in which the corresponding parts of the body portions of both rim sections lie in axial alignment throughout their entire circumferential extent, in which all locking means for holding the rim sections in assembled relation form integral parts of the sections themselves whereby to simplify manufacture and eliminate unnecessary parts, in which the engaging portions of the rim sections are so formed as to permit a slight relative axial movement therebetween after removal of the rim from the wheel to facilitate disassembly, and in which the means for precluding circumferential movement or creeping of the rim upon the wheel is also adapted to be used for sliding the rim sections relatively to each other.

These and other objects of the invention will more fully appear when taken in conjunction with the following description and the appended claims:

In the accompanying drawings, Fig. 1 is a fragmentary view, partly in section and partly in elevation, showing the rim in assembled relation with the tire thereon mounted upon the vehicle wheel; Fig. 2 a detail sectional view taken substantially on the line II—II of Fig. 1; Fig. 3 a view similar to Fig. 2 taken on the line III—III of Fig. 1; Fig. 4 an expanded view showing the relative positions which the rim sections assume when in assembled relation, together with the method employed for assembling the rim sections; and Fig. 5 an expanded view of the separated rim sections in the relative positions in which they are placed just prior to assembly.

In the drawings, 1 represents the felly of the wheel attached to the spokes 2 thereof, and equipped with the customary peripheral plate 3 having the usual flanged seating portion 4 against which the rim is adapted to abut when placed upon the wheel. The wheel is likewise also provided with the clips 5 secured to the felly by bolts 7, the clips 5 being in the form of wedge clips in accordance with well known practice and adapted to be urged towards the seating portion 4 by means of nuts 8.

The outer casing of the tire is shown at 9, and the inner tube and its valve stem at 10 and 11, respectively.

The parts thus far described correspond to well known devices now upon the market, and form no part of the present invention, except in so far as they cooperate with the novel rim construction to be subsequently set forth.

The improved rim comprises two continuous annular sections 12 and 13, each being provided with a body portion and an outwardly directed radial flanged portion. The body portion of the section 12 is indicated at 12′ and its radial flange at 12″, while the body and radial flanged portions of section 13 are designated by the numerals 13′ and 13″, respectively.

The inner edges of the sections opposite the flanges 12″ and 13″ are adapted to abut, and are provided with a series of spaced lugs. The lugs on the respective sections 12 and 13 are shown generally at 14 and 15. These lugs are so shaped as to form laterally projecting tongues at their ends and a recess of the same general shape adjacent thereto. For instance, the lugs 14 are provided with the tongues 14′, leaving the recess 14″ between it and the body portion of the section. Similarly, the lugs 15 of the section 13 are equipped with the tongues 15′ leaving the recesses 15″.

Superposed upon the section 12 is a band 16 rigidly attached thereto at suitable intervals as by the countersunk rivets 17. Preferably the band is discontinuous, as clearly shown in Figs. 4 and 5 of the drawings, closely abuts the flanged portion 12″, and is of such dimension as to terminate slightly short of the flanged portion 13″ when the rim sections are in assembled relation. In other words, a slight space such as indicated at 18 in Figs. 3 and 4 is left between the edge of the band and the inner face of the portion 13″.

The transverse dimension or width of the tongues 14′ and 15′ is also slightly less than that of the recesses 14″ and 15″ whereby to permit a sufficient play axially of the wheel between the sections 12 and 13 to disengage or loosen the sections in case of corrosion.

A lug 19 is rigidly attached to the section 12 and projects radially inwards beyond the body portion thereof, and is preferably so shaped as to form a tool-receiving shoulder 19' adjacent the said body portion while terminating in a conical extremity 19''. The rim section 13 is likewise equipped with a correspondingly shaped lug 20 disposed opposite the lug 19. The lugs 19 and 20 are adapted to engage openings 21 and 22, respectively, located in the plate 3, and also with depressions 21' and 22' in the felly 1, both the openings and depressions being disposed at a predetermined point circumferentially of the wheel to positively preclude creeping of the rim after it has been placed upon the wheel.

Preferably the lug 14 partially disposed between the ends of the band 16, as shown at 23 in Figs. 4 and 5, is cut away in the manner illustrated and one of the lugs 15 correspondingly cut away as at 23', to form an opening 24 through which the valve stem 11 may readily pass.

Both of the rim sections 12 and 13 are identical in structures so as to be interchangeable, the only difference therebetween in the finished rim being that the section 12 carries the attached band 16 while the section 13 has no additional parts fixed thereto.

In operation, the tube 10 and casing 9 are placed upon the section 12 overlying the band 16 and with the valve stem projecting through the opening 24 in an obvious manner. Section 13 is brought to the relative position shown in Fig. 5 and then moved to bring the tongues 15' opposite the recesses 14''. Subsequent turning movement of section 13, so as to cause relative circumferential movement between the sections, will then bring the tongues 14' and 15' into locking engagement with their receiving recesses 15'' and 14'', as illustrated in Fig. 4 of the drawings, and consequently hold the sections in assembled relation.

Relative circumferential movement between the rim sections may be facilitated and easily accomplished by placing a tool 25 in the position shown in Fig. 4, with the edges of the tool in abutting relation with the shouldered portions of the lugs 19 and 20, and using the tool as a lever to move the sections. As shown in this figure, the tool is properly positioned to move the sections out of locking engagement. It is obvious, however, that by projecting the tool so as to contact the opposite sides of the lug, that is by projecting it from the lefthand side of the lug 20 to the righthand side of lug 19, as viewed in Fig. 4, the tool may be used in an analogous way to assemble the rim.

After the rim has been assembled in the manner described, inflation of the tire will further aid in holding the rim sections in assembled relation.

The assembled rim with the attached tire is employed in the usual manner familiar to those skilled in this art, the rim being bodily placed upon and removed from the wheel and held in operative position thereon, by means of the clips, bolts, and nuts previously described. It is to be noted, however, that in placing the rim upon the wheel, care is taken to position the lugs 19 and 20 so as to engage the openings 21 and 22. Engagement of the lugs with their receiving openings positively precludes creeping movement of the rim upon the wheel.

The tongues 14' and 15' are purposely made of less width than their receiving recesses, and the band 16 is likewise so proportioned as to provide room for slight play between the rim section axially of the wheel. This is a feature of considerable practical importance, for the reason that corrosion between the abutting edges of the sections necessarily occurs during use. By placing the rim, after removal from the wheel, with the section 13 uppermost and tapping thereupon with a hammer, the play just referred to enables all sticking or binding of the section due to corrosion to be overcome, and permits easy separation of the sections.

Attention is particularly called to the fact that both sections 12 and 13 are identical and hence interchangeable during the process of manufacture or for the purpose of repair, also that all parts of the body portions of the rim sections lie in axial alignment throughout the entire circumference of the wheel. This not only simplifies the structure of the rim ultimately produced, but necessitates the use of less machinery in the manufacture of the rim, increases the strength thereof and greatly cheapens the cost of manufacture.

It is thus seen that the invention provides a simple, compact, economical and convenient construction of demountable rim made of separable sections identical in construction, and possesses the advantages indicated. In accordance with the provisions of the patent statutes, applicant has described the preferred embodiment of the invention. It is obvious, however, that various changes both in details and in the arrangement of parts may be made without departing from the spirit of the invention, and it is therefore not intended to limit the invention beyond that particularly defined by the appended claims.

I claim:

1. A demountable tire rim comprising two annular sections having inner abutting edges, a superposed discontinuous band rigidly attached to one of said sections, the abutting edges of the sections being provided with a series of projecting lugs forming tongues and recesses, the tongues of one section being adapted to interlock with the recesses of the remaining section upon relative circumferential movement of the sections whereby to hold the sections in assembled relation, the opposite ends of said band terminating short of each other leaving a space therebetween disposed in radial alignment with one of the lugs on each of said sections.

2. A demountable tire rim comprising annular sections each provided with a body portion and a radially projecting marginal flange, said body portions having inner abutting edges, a superposed band rigidly attached to one of said sections and overlying the remaining section, the abutting edges of the sections being equipped with series of integral projecting lugs forming tongues and recesses, the tongues of one section being adapted to interlock with the recesses of the remaining section upon relative circumferential movement of the sections, the width of the tongues being slightly less than the width of the recesses and the free marginal edge of the said band terminating short of the radially projecting flange on the underlying rim section whereby to permit slight relative axial movement between the sections, and a pair of spaced lugs projecting radially inwards of the rim, one of the said lugs being rigidly attached to each section and provided with a tool-receiving shoulder immediately adjacent the body portion of the rim.

In testimony whereof, I sign my name.

DAVID H. McCLELLAND.